United States Patent [19]

Giebmanns

[11] Patent Number: 4,747,237

[45] Date of Patent: * May 31, 1988

[54] METHOD FOR MANUFACTURING A FINISHED TURBINE BLADE FROM A RAW WORKPIECE

[76] Inventor: Karl-Hienz Giebmanns, 1 Ledgemoor La., Westport, Conn. 06880

[*] Notice: The portion of the term of this patent subsequent to Aug. 18, 2004 has been disclaimed.

[21] Appl. No.: 35,538

[22] Filed: Apr. 3, 1987

Related U.S. Application Data

[63] Continuation-in-part of Ser. No. 876,809, Jun. 20, 1986, Pat. No. 4,686,796.

[51] Int. Cl.⁴ .......................... B24B 5/00; B21K 1/20; B23P 13/00
[52] U.S. Cl. .................................... 51/328; 51/281 R; 51/144; 51/165.71; 29/156.8 B
[58] Field of Search ...................... 51/135 R, 141, 142, 51/143, 145 R, 46, 97 NC, 50, 165.71, 165.77, 281 R, 328; 29/156.8, 156 B, 418, 423, DIG. 29; 204/129.35

[56] References Cited

U.S. PATENT DOCUMENTS

4,686,796 8/1987 Giebmanns .......................... 51/144

Primary Examiner—Frederick R. Schmidt
Assistant Examiner—Maurina Rachuba
Attorney, Agent, or Firm—Klein and Vibber

[57] ABSTRACT

An improved method and apparatus for manufacturing finished turbine blades from a raw workpiece is disclosed wherein the path of a sanding shoe with respect to the workpiece is controlled as the workpiece is rotated on a spindle. The method involves plotting the profiles of the turbine blade in a number of planes, defining the profiles as a series of circle segments each having a center and an angular length, choosing an arbitrary center of rotation of the workpiece, measuring the distances from the center of rotation to each of the circle segment centers, plotting the hypothetical path of the center of rotation about each circle segment center by each corresponding angular length, and using the derived path of the center of rotation to control the movement of the shoe in a vertical direction and the workpiece in a horizontal direction as the workpiece rotates. The apparatus includes spindle means for rotating the workpiece about the center of rotation, and means for rotating the shoe axis about vertical and horizontal axes.

4 Claims, 5 Drawing Sheets

METHOD FOR MANUFACTURING A FINISHED TURBINE BLADE FROM A RAW WORKPIECE

This application is a continuation-in-part of application Ser. No. 876,809, entitled METHOD AND APPARATUS FOR IMPROVED POLISHING OF TURBINE BLADES, filed June 20, 1986, issued Aug 18, 1987 as U.S. Pat. No. 4,686,796, which disclosed and claimed essentially the same subject matter as disclosed and claimed herein.

The parent application set forth a method and apparatus which could be used to polish a "pre-finished" or "rough form" turbine blade. In actual practice, however, it has been discovered that the method and apparatus of the parent application can be used to manufacture a turbine blade from a monolithic work piece and that no prefinishing or rough form creation is necessary. The applicant believes that this discovery renders his invention significantly more useful and valuable, than was previously disclosed. Moreover, applicant desires to claim all of the newly discovered features of his invention which were not claimed in the parent application.

Thus, the application which follows is substantially the same as the parent application except that it makes clear that the starting workpiece need not be a prefinished or rough form turbine blade, but may be a totally raw monolithic workpiece.

BACKGROUND OF THE INVENTION

The present invention relates to a method and apparatus for the manufacturing of turbine blades. The manufacture of turbine blades presents a difficult problem to the machinist. Turbine blades require a very complicated surface involving curves in three dimensions. The only known method of manufacturing a turbine blade in a single automated process is by precision forging. See, e.g., U.S. Pat. Nos. 4,526,747 and 4,489,469. However, precision forging of turbine blades is extremely expensive and is only practical when producing a large number of identical turbine blades. Moreover, creating the cast for precision forging is a time consuming and substantially manual procedure which suffers from the same drawbacks as the other methods of manufacturing turbine blades discussed below.

It is not unusual to divide the manufacturing process into two stages, the creation of a rough form turbine blade, followed by precision polishing. Known methods of polishing turbine blades include the electrical and chemical discharge methods. See, e.g., U.S. Pat. Nos. 4,234,397 and 4,141,127. These methods, like precision forging, are expensive, time consuming and only viable in the mass production of a large number of identical turbine blades.

Another known method of manufacturing turbine blades involves polishing a rough form turbine blade using a belt sander. See, e.g., U.S. Pat. Nos. 4,473,931; 4,285,108; 4,031,699; 3,925,937; 3,685,219; and 2,722,788. In accordance with this method, a rough form for the turbine blade is manufactured by forging or milling within 5/1000 inch of the final form. The rough form is then polished by hand or mounted in a belt sanding machine tool which polishes the blade by removing no more than 5/1000 inch from the surface of the rough form. The blade must constantly be checked with guillotine guages during the sanding process and the measurements taken by the guages compared to a table of measurements to guarantee adequate conformity with the specific desired shape of the individual blade to be polished.

In order to appreciate the problems encountered with known methods and apparatuses for manufacturing turbine blades, it should be noted that the surface of the turbine blade surface must be formed in three dimensions. These dimensions may be viewed by reference to X, Y, and Z azes. Thus, the finished surface of the turbine blade is defined by at least two curves, one in the Z—Y plane and another in the Z—X plane. Typically, the surface of a turbine blade is more complex, being defined by a great number of curves in a corresponding number of planes parallel to the Z—Y plane and/or the Z—X plane. (As used herein, Z—Y plane will mean the Z—Y plane and planes parallel to it. Similarly, Z—X plane will mean the Z—X plane and planes parallel to the Z—X plane. Z—Y curve will mean a curve in the Z—Y plane, and Z—X curve will mean a curve in the Z—X plane.)

Known methods and machine tools for polishing semi-finished turbine blades utilize a belt sanding device wherein a narrow sanding belt is arranged on a pulley known as a shoe. The axis of the shoe is usually arranged parallel to the longitudinal or X axis of the turbine blade. A tubine blade in rough form is mounted on a movable platform beneath the sanding belt. The sanding belt is brought into contact with the surface of the blade to be polished and the blade, via the movable platform, is moved along the X axis with respect to the shoe. While the blade is moving along the X axis, the position of the shoe in the vertical or Z axis is adjusted either according to a computer program or input from a roller rolling along a template or the like. When the blade finishes its travel in the direction of the X axis, the blade is polished to form a curve in the Z—X plane. In order to define the curve of the turbine blade in the Z—Y plane, the blade must be moved along the Y axis and the position of the shoe in the Z axis must also be adjusted accordingly. Typically, a program or operator instructs the movable platform to move in the Y direction by an incremental amount dependent on the surface finish to be achieved (i.e. move a small amount for a very smooth finish, move a larger amount for a less smooth finish). Whereupon, the platform makes another traverse in the X direction, whereby moving the blade with respect to the shoe while the shoe is instructed to move appropriately in the Z direction.

Since the Z—X profile of the blade is not necessarily constant along the Y axis, the movement of the shoe in the Z direction during each pass of the blade in the X direction will not necessarily be the same as the movement during the previous pass. If a computer program is being used to control the Z movement of the shoe, a new set of points or instructions may be required.

Figure 1:
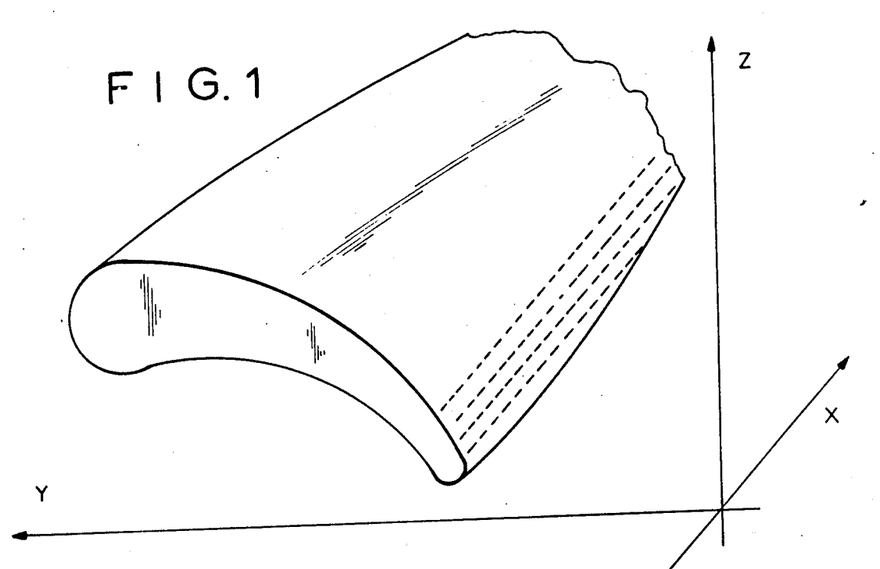
FIG. 1 is a perspective view of a portion of a typical turbine blade, partially in cross section in the Z—Y plane.

This process is repeated until the turbine blade has fully traversed the shoe in the X and Y directions. The process results in a series of steps approximating curves in the planes parallel to the Z—Y plane (See FIGS. 1 and 3). These steps approximate the curves to be obtained in planes parallel to the Z—Y plane by a number of points between which the shoe polishes a relatively flat surface of the blade (See FIG. 3). Normally, anywhere between 400-600 points are needed to define an approximate curve in a Z—Y plane. The number of points or steps permitted is actually limited by the mechanical devices used. The movable platform and shoe positions are controlled by servo motors which are limited by their acceleration in the number of times they can be started and stopped in a given distance. Thus, when sanding with the belt sander is completed, the surface of the curves in the Z—Y planes are approximate, being a series of flat surfaces rather than a continuously curving surface. Depending on the number of points or steps used, further hand sanding may be required. The hand sanding is quite tedious requiring the use of guillotine gauges and constant reference to a table of measurements.

Moreover, the known methods and apparatuses for polishing turbine blades have no way of incorporating a full rotational movement of the turbine blade about the X axis while sanding. Only one side of the turbine blade may be sanded and the blade must then be re-mounted to sand the other side. Thus, the belt sanding methods and apparatuses currently known, do not allow for completely automated production of turbine blades, but require several manual operations including tedious manual finishing in order to smooth out the complex surface of the blade. Moreover, the known methods require that the workpiece be "prefinished" or a "rough form" of the blade to be ultimately manufactured.

SUMMARY OF THE INVENTION

The present invention provides a method and apparatus for manufacturing a turbine blade in a single automated operation whereby a blank monolithic workpiece is sanded so that the curves created in the Z—X and Z—Y planes are totally smooth and do not require any manual sanding. Moreover, the method and apparatus of the present invention allows a finish of turbine blades within 10 microns which is comparable to the finish obtained by precision forging. Unlike precision forging, however, the method and apparatus of the present invention can be reprogramed in a very short time to accommodate a new turbine blade surface with the same precision. Thus, the method and apparatus of the present invention allows for the economic production of precision turbine blades in a relatively short time.

The present invention provides a method and apparatus for changing the position of the shoe in the Z axis direction as the workpiece traverses the shoe in the Y axis direction and is simultaneously rotated such that a complete by smooth and continuous relative motion of the workpiece and shoe results. This removes all of the inaccuracies in the Z—Y curves of the resulting turbine blade. Moreover, the present invention provides an apparatus and a method whereby the axis of the shoe is tilted in the Z—X plane and in the X—Y plane as the workpiece traverses the shoe in the X and Y axis directions. By providing for such tilting of the shoe axis, the "step like" approximate form of the curves is eliminated. Thus, the resulting curves of the turbine blade surface in both Z—Y and Z—X planes are smooth and the surface does not require manual polishing.

The method of the present invention is also simpler and faster than any other method of manufacturing a turbine blade with a belt sander in that it does not require a prefinished workpiece nor does it require as many steps or points as previously known methods of polishing turbine blades. For example, known methods of polishing turbine blades require from 400 to 600 steps or points to approximate a curve while the present method can reproduce an exact curve with as few as 4 steps or points. This accomplishment is quite significant when one considers that the present invention does not require a prefinished workpiece, but can manufacture a completed turbine blade starting only with a monolithic workpiece.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

The method and apparatus of the present invention are totally unique and heretofore unknown in that they provide a means for manufacturing a turbine blade in a single automated process, starting only with a monolithic workpiece. As described hereinabove, previously known methods and apparatuses required the prefabrication of a rough form turbine blade which was then finished by sanding. The present invention, while in essence a sanding operation, can be used to create a finished turbine blade from a totally raw block of a workpiece. Nevertheless, there exist certain similarities between the present invention and the earlier known methods of "finishing" prefabricated workpieces. In order to more clearly understand the important new features of the present invention, reference is made throughout this specification to the sanding "finishing" process as heretofore known. It should be emphasized, however, that the present invention is not limited to "finishing" sanding.

Figure 2:
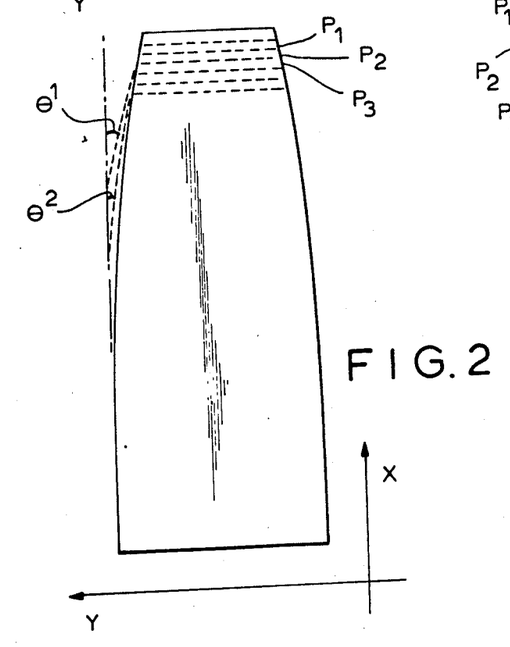
FIG. 2 is a plan view in the X—Y plane of the blade shown in FIG. 1.

With the above caveat in mind, the method and apparatus of the present invention can best be seen from two approaches. First, there is the problem of smoothing the curves in the Z—Y plane (FIG. 3), and second there is the problem of smoothing the curves in the Z—X and Y—X planes (FIGS. 2 and 4). Both problems are solved by the method and apparatus of the invention.

Figure 3:
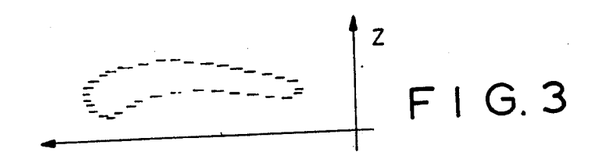
FIG. 3 is a cross section in the Z—Y plane of the turbine blade shown in FIGS. 1 and 2 after belt sanding according to previously known methods, showing the approximate nature of the curves in the Z—Y plane.
Figure 4:
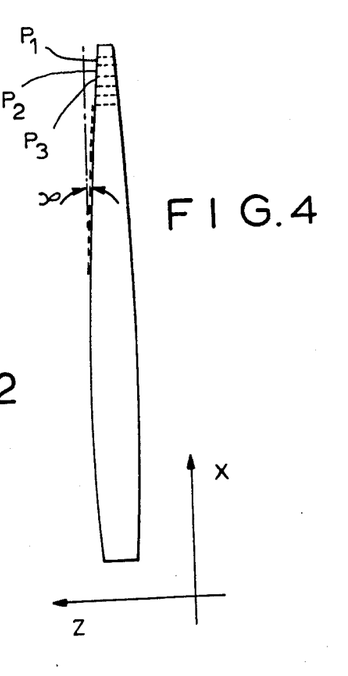
FIG. 4 is a side elevation of the turbine blade shown in FIGS. 1 and 2, showing a profile of the blade in the Z—X plane.

As to the first problem, smoothing the curve in the Z—Y plane, it is noted that the prior methods define the curve as a series of points connected by straight lines as shown in FIG. 3. This is a common method of approximating a curve and, depending on the number of points chosen, will result in a relatively smooth or relatively rough surface. In practice, usually 400-600 points are chosen to result in a relatively smooth surface after sanding. However, this method requires between 400-600 start and stop instructions as the turbine blade is moved with respect to the sanding shoe and the position of the shoe is in turn adjusted. Since the movements of the shoe and the turbine blade are effected by servo motors, and the number of instructions sequentially fed to these motors is quite large, the process is extremely time consuming. The present invention defines the curved surface as an essentially single continuous movement from beginning to end, requiring only a minimum number of instructions (points), thereby saving substantial time in the process while producing a superior result.

Figure 5:
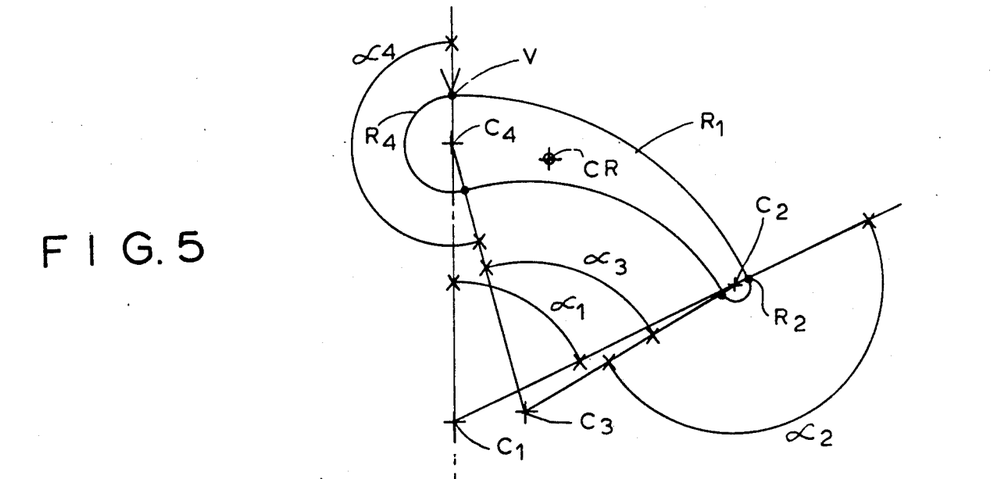
FIG. 5 is a cross section in the Z—Y plane of an ideal finished turbine blade showing the surface of the blade as a number of continuous curve segments with their respective centers and angular lengths and indicating an arbitrary center of the blade.
Figure 5A:
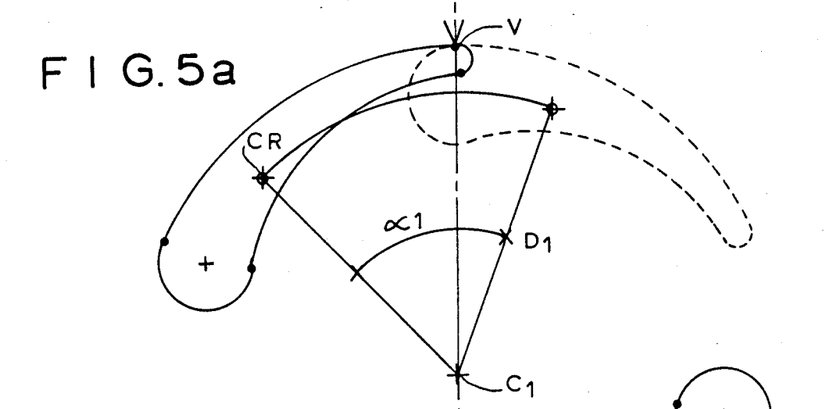
FIGS. 5a-5d are views similar to FIG. 5 showing the blade's center rotated in the Z—Y plane about the curve segment centers by their respective angular measurements.
Figure 5B:
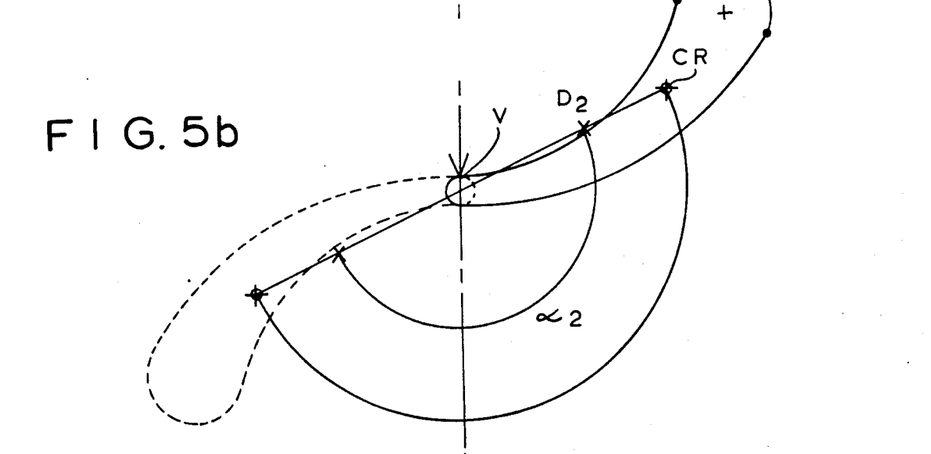
Figure 5C:
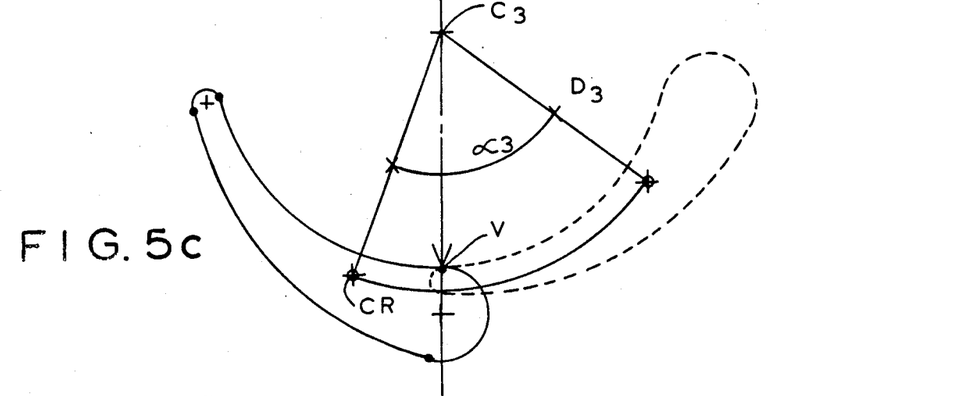
Figure 5D:
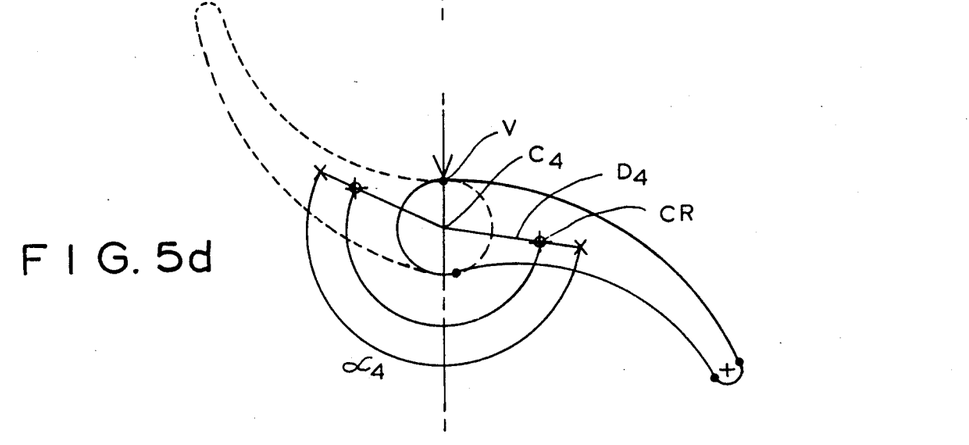
Figure 6:
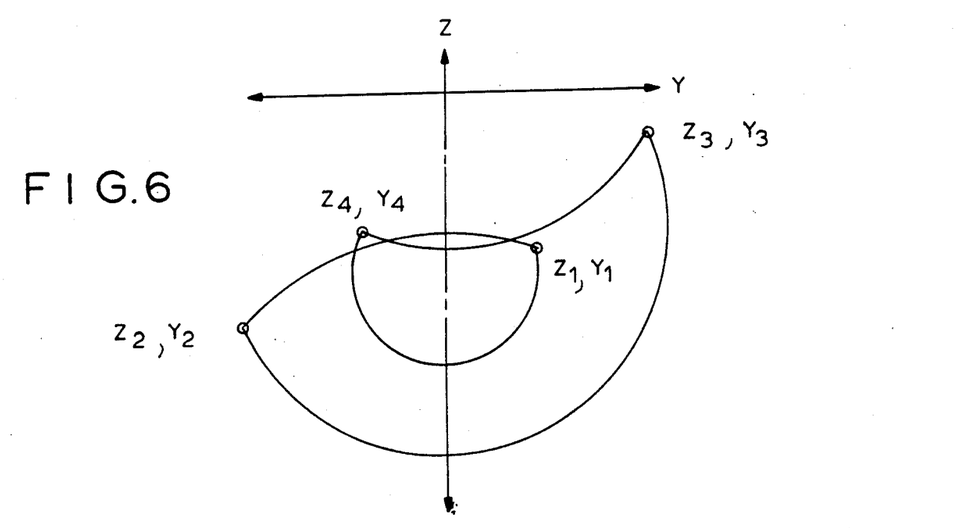
FIG. 6 is a diagram showing the path of the turbine blade center in the Z—Y plane as it is rotated in accordance with FIGS. 5a-5d.

For example, FIG. 5 shows the ideal surface of a typical turbine blade in cross-section in a Z—Y plane. The complex curve of the surface can be divided into several segments each of which is a portion of a circle (an arc) R having a center c, and an angular length [alpha]. The turbine blade surface shown in FIG. 5 for example, can be defined by four circle segments R1 through R4, each having respective centers c1 through c4, and angular lengths [alpha]1 through [alpha]4. Moreover, an arbitrary center of the turbine blade cross section CR can be chosen. Hypothetically, it is possible to produce a totally smooth curve in the Z—Y plane with a sanding belt by rotating the center CR of the turbine blade around the center c through angle [alpha]of each circle segment R as the sanding belt shoe V remains fixed in the Z axis. FIGS. 5a through 5d show how the workpiece would be moved relative to the shoe V to accomplish the smooth sanding. FIG. 6 shows diagramatically the path of the turbine blade center in the Z—Y plane as the turbine blade (workpiece) is rotated the appropriate amount [alpha] about each circle segment center c according to FIGS. 5a-5d. Unfortunately, in order to move the turbine blade with respect to the shoe as shown in the aforementioned figures, an extremely complicated apparatus would be required. To simply rotate the blade about its own center CR, however, would not be difficult. The method and apparatus of the present invention provide a means whereby the same relative movement of the turbine blade and the shoe as shown in FIGS. 5a-5d can be accomplished by synchronizing movement of the shoe in the Z direction with a rotation of the blade about an axis passing through its center CR as the tubine blade axis is moved in the Y direction.

The method of the invention can be best understood by reference to FIGS. 5, 5a-5d, and 6. The method comprises the following steps:

(1) choosing an arbitrary center CR of the turbine blade cross-section in the Z—Y plane (FIG. 5), (2) defining each Z—Y profile (e.g. P1, P2, P3, etc. as shown in FIGS. 2 and 4) of the turbine blade as a series of circle segments R1, R2, etc., each having a respective center c1, c2, etc. and a respective angular length [alpha]1, [alpha]2, etc. (FIG. 5), (3) finding the distances D1, D2, etc. from the blade center CR to each circle segment center c1, c2, etc. (FIGS. 5a-5d)

(4) plotting the path of the blade center CR in the Z—Y plane such that the blade center CR moves sequentially about each circle center c1, c2, etc through an angular length [alpha]1, [alpha]2, etc. (FIGS. 5a-5d and 6), the path of the center CR being a series of circle segments joined to each other at end points (Z1,Y1), (Z2,Y2), etc. in the Z—Y plane (FIG. 6), (5) synchronizing movement of the shoe in the Z direction and the blade in the Y direction and a rotation of the blade about its center CR such that as the blade rotates about its center CR through an angle [alpha]n corresponding to circle segment Rn, the blade and shoe are moved in the Y and Z directions respectively from the beginning point (Zn,Yn) corresponding to circle segment Rn to the point (Zn+1,Yn+1) corresponding to the beginning of circle segment Rn+1, the change in Z position relative to the change in Y position being defined by a circular path having a radius Dn (FIGS. 5a-5d), (7) repeating the last step for each circle segment R2, R3, etc., (8) incrementing the positioin of the blade relative to the shoe in the X direction, and (9) repeating steps 3 through 8 for each Z—Y profile defined in step 2 until the blade is completely polished.

The operation of the method described above can be better understood by reference to the apparatus used to perform it.

Figure 7:
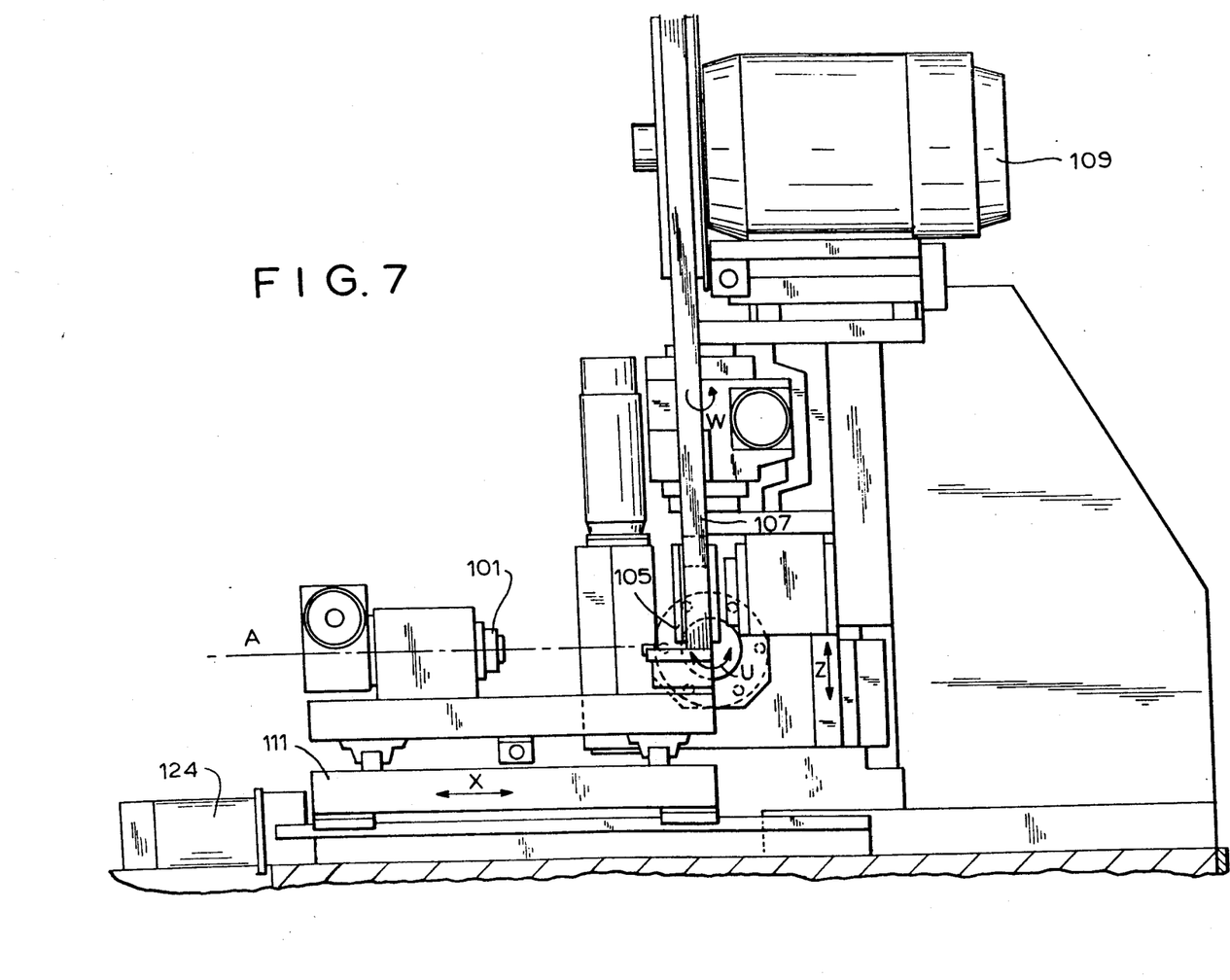
FIG. 7 is a side elevational view in the Z—X plane of the apparatus of the invention.
Figure 8:
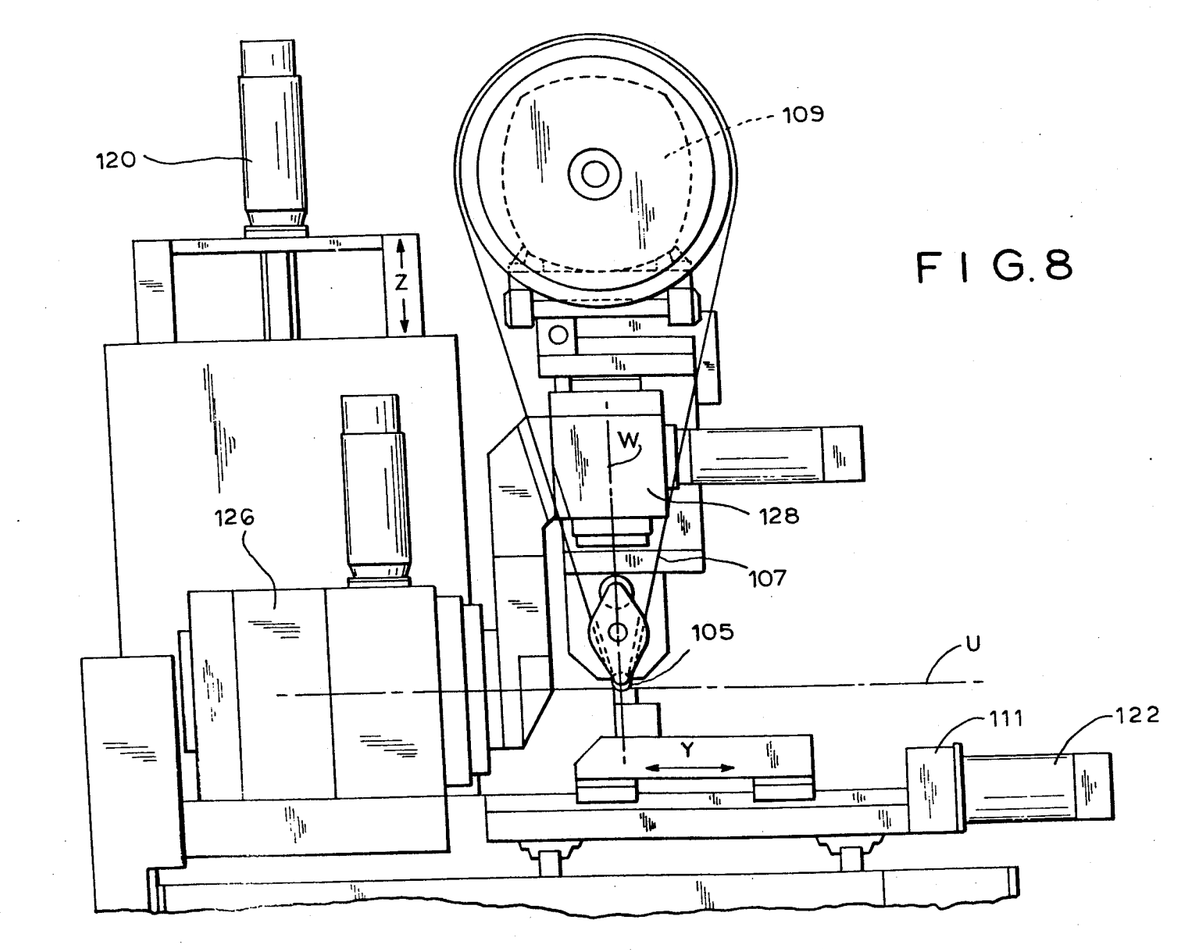
FIG. 8 is a side elevational view in the Z—Y plane of the apparatus of the invention.

Referring to FIGS. 7 and 8, the apparatus provides for movement of the turbine blade (workpiece) in the X direction and in the Y direction by mounting it on a movable platform 111. The shoe 105 is movable in the Z direction and the blade (workpiece) may be rotated about axis A by spindle 101. The movement of the blade (workpiece) and the shoe according to the method described above is accomplished by the novel application of a known control device called a CNC device.

Computer numerical control (CNC) devices are known in the art of operating various machine tools. Such devices generally provide for what is known as linear, circular, or helical motion. For example, linear motion is controlled by a CNC device by entering an X and a Y value. The CNC device computes the slope of a line which would run from the point 0,0 to the point X,Y. When in operation, the CNC device increases the X and Y values proportionately according to the computed slope. These X and Y values may be used to control various parts of machine tools such that each part of the machine tool arrives at its respective position simultaneously with the other part. A CNC device in the "linear mode" can thus control two parts of a machine tool guiding them in a computed ratio such that they reach a defined position X, Y at the same time in a smooth operation.

Most CNC devices also have a circular mode which allows the entry of three variables, for example, X, Y, and R. In the circular mode, a CNC device computes the equation of a circle having a radius of R passing through points X, Y. In operation in the circular mode, the CNC device will increase or decrease the values of variables X and Y as necessary to define a circular path from the point 0,0 to the point X, Y, which circular path has a radius of R. Obviously there are two possible paths given the end points of an arc and a radius, one path convex and the other concave. The CNC device allows a choice between these two possibilities.

CNC units in the circular mode, are useful for controlling a machine tool which is to move something in a circle. However, they have not found any application in the polishing (or manufacturing) of turbine blades since the curve of a turbine blade has a changing radius.

Many CNC units also have a helical option which adds a single linear variable to the three circular variables. In the helical mode, such a CNC unit will begin with four variables, for example, X, Y, Z, and R. In operation, the CNC unit will increase or decrease the values of Z and Y to define a circle in the Z—Y plane having a radius of R and will simultaneously increase the value of X from 0 to X linearly in order to reach its final value simultaneously with the reaching of values Z and Y. This mode is referred to as the helical mode since it is commonly used in machine tools for moving something in a helical path.

It has been discovered that by utilizing the helical mode of a known CNC device, the apparatus described above can be controlled so the positions of the shoe of the belt sander and the turbine blade can be moved in accordance with the method described above in a smooth path defining a curve of changing radius in two dimensions. This is accomplished by using the method described above wherein, the helical mode of a CNC device is used to move the sanding tool (shoe) in the Z axis and the blade in the Y axis in a series of circular paths from the end point of one circle segment to the end point of the next circle segment, for example from point Z1,Y1 to point Z2,Y2 as shown in FIG. 6. As indicated above, the helical mode of a CNC device also allows the movement of one linear variable simultaneously with the circular movement. This linear variable is used to simultaneously rotate the blade (workpiece) about its center CR through the angular length associated with each circle segment as described above.

By implementing the helical mode of a CNC device in a turbine blade polishing (or manufacturing) machine as described above, the method of the present invention can accomplish the same smooth surface result as if the turbine blade had been moved with respect to a stationary sanding shoe as illustrated in FIGS. 5a–5d. Use of the present invention will therefore result in a Z—Y curve which is completely smooth and does not require any manual sanding. Moreover, the present invention greatly simplifies the process of manufacturing and polishing turbine blades by minimizing the number of coordinates needed to define the curved surface to be manufactured/polished. For example, in order to sand the surface shown in FIG. 5, only four sets of coordinates need to be fed to the CNC device one after the other, whereas in the prior art between 400–600 sets of coordinates would be needed. For example, the first set of coordinates X, Y, Z and R to be entered into the CNC device would define the first circle segment of the surface shown as R1 in FIG. 5, a second set of coordinates will define the segment shown as R2, etc..

By referring to FIGS. 5 and 6, the first set of coordinates to be entered into the CNC device can be found as follows: the linear variable X=[alpha]1, the angular length of the first circle segment. The circular variables Y,Z, and R are found as follows: Y=Y2−Y1, the change in the Y position of the blade's center CR as shown in FIG. 6; Z=Z2−Z1, the change in the Z position of the blade's center CR as shown in FIG. 6; R=D1, the radius of the circular path followed by the blade's center CR as shown in FIG. 5a which is the distance of the blade center CR from the first circle segment center c1. In addition, one other variable need be entered to instruct the CNC that the path to be followed is convex as shown in FIG. 6. With this first set of variables, the CNC device will control the apparatus of the invention to manufacture/polish the first portion of the turbine blade designated as R1 in FIG. 5.

The sanding belt shoe would begin movement in the Z direction as the platform on which the blade (workpiece) is mounted moves in the Y direction, both being controlled by the CNC device, which CNC device simultaneously controls a rotation of the blade (workpiece) about its center CR. The CNC device directs the shoe to arrive at the point Z=Z2−Z1 at the same time that the blade (workpiece), via the platform, arrives at the point Y=Y2−Y1, at the same time that the center of the blade (workpiece) CR has been rotated through an arc of [alpha]1 degrees. At this point, the CNC device is fed the next set of variables X=[alpha]2, Y=Y3−Y2, Z=Z3−Z2, and R =D2, and the convex instruction. The next segment of the ZY profile of the blade (workpiece) is then manufactured/polished, etc. This is repeated until the complete first ZY profile is completed. Then the apparatus is directed to move the platform holding the blade an incremental amount in the X direction and the second ZY profile is sanded in the same manner, possibly with a new set of variables. This is repeated until each ZY profile is sanded.

The foregoing description describes the first embodiment of the present invention which can be used to achieve smoothly polished curves in the Z—Y plane. In order to achieve smooth curves in the Z—X plane (FIG. 4) and the Y—X plane (FIG. 2) as well, a second embodiment of the invention is presented.

In the apparatus described above, after each traverse by the blade (workpiece), via the movable platform, in the Y direction, the turbine blade (workpiece) via the platform 111 is moved a small amount (defined by the width of the sanding belt) along the X axis and a new profile in the Z—Y plane is sanded. This process is repeated a number of times until a profile is formed along the surface of the turbine blade in the X direction as shown in FIGS. 2 and 4. The method and apparatus of the present invention to be described below, allows for a smoothing of this profile in the X direction so that no manual sanding is necessary to smooth out the surface of the blade.

It should be noted at this point that when the invention is used to manufacture a turbine blade from a raw workpiece, i.e. not simply polish a prefinished rough form, it is advisable to change the sanding belt of the apparatus during the operation. The inventor has used norton norzone belts successfully in the apparatus and it is recommended that a 24 grit belt be used to grind (sand) the raw workpiece until it is within 2/1000 to 3/1000 of an inch from finished; then switch to a 180 to 200 grit belt and continue the sanding process until the finish is within 10 microns of the desired profile. During any sanding operation, of course, coolant oil should be delivered to the point of sanding contact. It is advisable to supply coolant oil at a rate up to 30 gallons per minute at the point of shoe contact with the workpiece.

Referring now to FIGS. 7 and 8, an apparatus in accordance with the present invention is shown in a side elevational view looking in the Z—X and Z—Y planes respectively. A spindle 101 for rotating a workpiece (or a rough form turbine blade, not shown) about its center of rotation in axis A is provided perpendicular to the Z—Y plane. The spindle 101 is mounted on a movable platform 111 which is movable in the X and Y directions. Shoe 105 carries sanding belt 107 driven by motor 109. According to the present invention, shoe 105, belt 107 and motor 109 can be moved simultaneously in the Z direction, that is up and down. This Z direction movement can be accomplished by any known means shown schematically in FIG. 8 as 120. Typically, the platform 111 will move in the Y direction as shown in FIG. 8, while the shoe 105 moves in the Z direction while the turbine blade mounted on the spindle 101 is rotated about the A axis in accordance with the method of the invention described above. After each cut in the Z—Y plane, the workpiece, via the platform 111, is advanced in the X direction as shown in FIG. 7, whereupon another cut in the Z—Y plane is performed. Means for moving the platform in the Y and X directions may be any known means and are shown schematically in the figures as 122 and 124 respectively.

In addition to the movements described above, however, the apparatus of the present invention provides means, 126, 128 in FIG. 8, for rotating the belt 107, shoe 105 and motor 109 simultaneously about a U axis and a W axis. The U axis is perpendicular to the X—Z plane and parallel to the Y axis defined by the edge of the belt 107 as shown in FIG. 7, this edge being the edge which faces the already polished (sanded) portion of the blade (workpiece), the trailing edge as the blade (workpiece) is moved along the X axis. The W axis is parallel to the Z axis and intersects the U axis and the axis of the shoe 105 as shown in FIG. 8. By tilting the shoe 105 relative to the U and W axes as the turbine blade (workpiece), via the platform 111, traverses the shoe 105 in the Y direction, the polishing (sanding) surface of the belt relative to the blade (workpiece) is thereby adjusted and a turbine blade profile is created in the Z—X and Y—X planes (FIGS. 2 and 4) which could not be produced without such tilting.

As described above, after each traverse of the shoe 105 by the blade (workpiece) in the Y direction, the blade (workpiece) is then moved along the X axis. In accordance with the second embodiment of the invention, however, the shoe is tilted in the U and W axes appropriately as the blade (workpiece) moves in the Y direction and is rotated about its center CR. The tilting of the shoe 105 in these two directions accomodates the changing profile of the blade (workpiece) in the X direction. See FIGS. 2 and 4. Moreover, as the blade (workpiece) is rotated about its center, the degree of tilting in the U and W axes can accomodate an X direction taper in the blade as shown in FIG. 2.

To control the tilting action of the shoe, a CNC unit is utilized for controlling the movement of the apparatus and workpiece relative to each other. In this case, however, it is necessary to control 6 variables rather than 4. In order to accomplish this, a CNC device with a "circular plus 3 linear" mode is required. Such a device is available, for example, Siemens CNC device No. 850. This device allows for the simultaneous control of 3 circular variables (e.g. X, Y, and R) plus 3 linear variables, thus 6 variables. The method employed includes the method described above with the addition of two variables to tilt the shoe in both the U and W axes. These additional variables for tilting the shoe can be found by comparing the adjacent Z—Y profiles of the turbine blade in the X direction. See, e.g. P1 and P2 in FIGS. 2 and 4. By noting the difference in radius of corresponding adjacent (in the X direction) circle segments of the adjacent Z—Y profiles and the distance between the profiles, an angle [gamma] of rise or fall in the X direction can be found. This angle is used to tilt the shoe in the U axis (See, e.g. FIG. 4). Moreover, the taper of the blade Y—X plane [theta] as shown in FIG. 2 can be used to determine appropriate tilting of the shoe in the W axis. If necessary, the CNC device can be instructed to halt rotation of the blade while a tilting of the shoe in the W or U axis is accomplished. Whereupon the rotation can be continued with the shoe in the proper position to polish (sand) the tapered surface of the blade (workpiece).

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A method for manufacturing a finished turbine blade from a raw workpiece comprising the following steps:
   beginning with a raw unfinished workpiece of suitable size, and
   (1) selecting an arbitrary center of rotation of the workpiece for mounting the workpiece on a spindle,
   (2) defining each of a plurality of profiles of the workpiece in a respective number of planes perpendicular to said spindle axis, each profile being defined as a series of circle segments each circle segment having a center and an angular length,
   (3) measuring each respective distance from the center of rotation to each circle segment center,
   (4) plotting on a data receiving medium the hypothetical paths of the center of rotation of the workpiece in each of said planes perpendicular to the spindle axis, each said hypothetical path being the path the center of rotation would follow if the center of rotation were rotated in series about each of said circle segment centers through each of said respective angular lengths, each of said hypothetical paths being a series of circle segments defined by a series of end points, each end point corresponding to each of said circle segments,
   (5) synchronizing (a) movement of a sanding shoe axis in the vertical direction and (b) movement of the workpiece in a horizontal direction perpendicular to the spindle axis of rotation and (c) rotation of the workpiece on the spindle axis such that as the workpiece rotates through an angular length defined in step 2, the horizontal position of the workpiece and vertical position of the shoe are moved in a circular path, said path having a radius equal to the corresponding distance measured in step 3, in the respective plane perpendicular to the spindle axis from the respectine end point corresponding to the respective angular length to the next respective end point in the series of end points defined in step 4,
   (6) repeating step 5 for each circle segment in series,
   (7) incrementing the positioin of the workpiece in a horizontal direction parallel to the spindle axis, and
   (8) repeating steps 5 through 7 for each profile of the workpiece until the turbine blade is completely polished.

2. A method for manufacturing a finished turbine blade from a raw workpiece comprising the following steps:
   beginning with a raw unfinished workpiece of suitable size, and (1) selecting an arbitrary center of rotation of the workpiece for mounting the workpiece on a spindle, (2) defining each of a plurality of adjacent profiles of the workpiece in a respective number of planes perpendicular to said spindle axis, each profile being defined as a series of circle segments each circle segment having a center and an angular length, (3) measuring each respective distance from the center of rotation to each circle segment center, (4) plotting on a data receiving medium the hopothetical paths of the center of rotation of the workpiece in each of said planes perpendicular to the spindle axis, each said pypothetical path being the path the center of rotation would follow if the center of rotation were rotated in series about each of said first circle segment centers through each of said respective angular lengths, each of said hypothetical paths being a series of circle segments defined by a series of end points, each end point corresponding to each of said circle segments, (5) measuring the angles of rise or fall between corresponding circle segments of each of said adjacent profiles, (6) synchronizing (a) movement of a sanding shoe axis in the vertical direction and (b) movement of the workpiece in a horizontal direction perpendicular to the spindle axis of rotation and (c) rotation of the workpiece on the spindle axis such that as the workpiece rotates through each respective angular length, the horizontal position of the workpiece and vertical position of the shoe are moved in a circular path, said path having a radius equal to each respective distance, in the respective plane perpendicular to the spindle axis from the respective end point corresponding to the respective angular length to the next respective end point in the series of end points, (7) synchronizing rotation of the shoe axis about the horizontal and vertical axes with said movement of the workpiece in a horizontal direction perpendicular to the spindle axis of rotation and said rotation of the workpiece on the spindle axis such that the shoe axis assumes an angle equal to said angle of rise or fall between adjacent profiles, (8) repeating steps 6 and 7 for each second circle segment, (9) incrementing the positioin of the workpiece in a horizontal direction parallel to the spindle axis, and (10) repeating steps 5 through 9 for each profile of the workpiece until the turbine blade is completely polished.

3. A method as claimed in claim 1 further comprising: beginning the process with a sanding belt mounted on said shoe axis, said belt having a grit of approximately 24, sanding said workpiece until it is within 2/1000 to 3/1000 of an inch from finished, then changing said belt to a belt with a grit of approximately 180 to 200, and continuing the sanding process until the finish of the workpiece is within 10 microns of the desired profile.

4. A method as claimed in claim 2 further comprising: beginning the process with a sanding belt mounted on said shoe axis, said belt having a grit of approximately 24, sanding said workpiece until it is within 2/1000 to 3/1000 of an inch from finished, then changing said belt to a belt with a grit of approximately 180 to 200, and continuing the sanding process until the finish of the workpiece is within 10 microns of the desired profile.

* * * * *

UNITED STATES PATENT AND TRADEMARK OFFICE
CERTIFICATE OF CORRECTION

PATENT NO. : 4,747,237
DATED : May 31, 1988
INVENTOR(S) : Karl-Heinz Giebmanns

It is certified that error appears in the above-identified patent and that said Letters Patent are hereby corrected as shown below:

On the first page of the printed Patent, No.: 4,747,237 at [56] " References Cited" the following publication has been omitted and should be entered in the proper permanent file:

--Publication: Plant and Operation
Publisher  : Carl Hanser Verlag
Title      : NC-Copy-Grinding Machine for Turbine Blades
Date       : 1986--(month unknown).

Signed and Sealed this

Sixth Day of September, 1988

Attest:

DONALD J. QUIGG

Attesting Officer

Commissioner of Patents and Trademarks